L. H. WATSON.
Gearing for Washing-Machines.

No. 211,310. Patented Jan. 14, 1879.

WITNESSES. William M. Baker John H. Wagner

Inventor Lewis H. Watson

L. H. WATSON.
Gearing for Washing-Machines.
No. 211,310. Patented Jan. 14, 1879.
3 Sheets—Sheet 2.
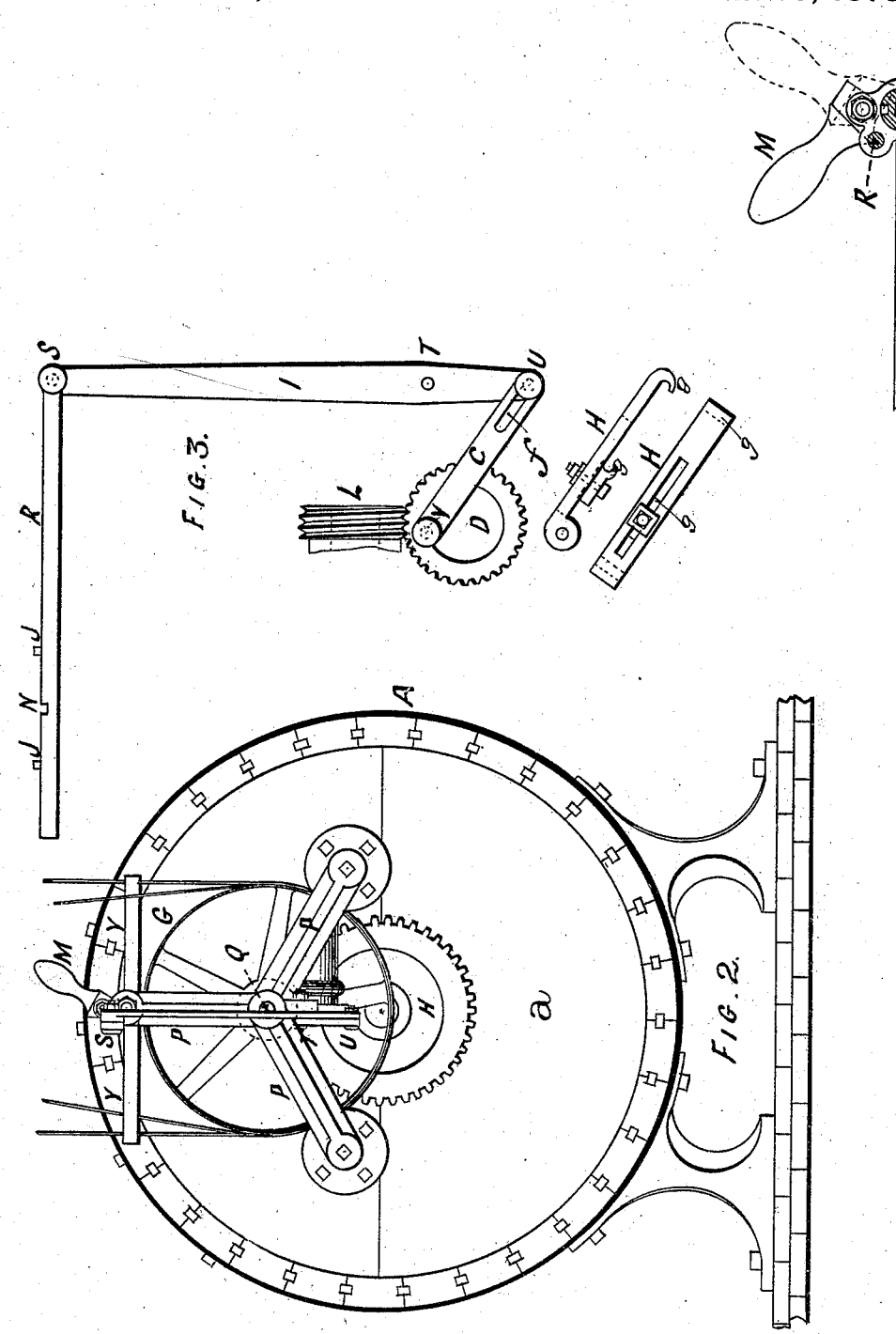
WITNESSES.
William M Baker
John H. Wagner
Inventor
Lewis H. Watson 3 Sheets—Sheet 3.

L. H. WATSON.
Gearing for Washing-Machines.

No. 211,310. Patented Jan. 14, 1879.

WITNESSES
William M. Baker
John N. Wagner

Inventor:
Lewis H. Watson

N. PETERS, PHOTO-LITHOGRAPHER, WASHINGTON, D. C.

UNITED STATES PATENT OFFICE.

LEWIS H. WATSON, OF CHICAGO, ILLINOIS.

IMPROVEMENT IN GEARINGS FOR WASHING-MACHINES.

Specification forming part of Letters Patent No. 211,310, dated January 14, 1879; application filed August 10, 1878.

*To all whom it may concern:*

Be it known that I, LEWIS H. WATSON, of Chicago, Cook county, Illinois, have invented certain Improvements in Gearing adapted for Reversing the Rotary Movement of a Revolving Cylinder for Washing-Machines, of which the following is a specification:

My invention relates to that class of washing-machines in which a stationary shell and an inner revolving cylinder are used; and it consists in the arrangement and combination of parts whereby the cylinder is made to revolve in opposite directions automatically and alternately, as will be more fully described hereinafter.

Figure 1:
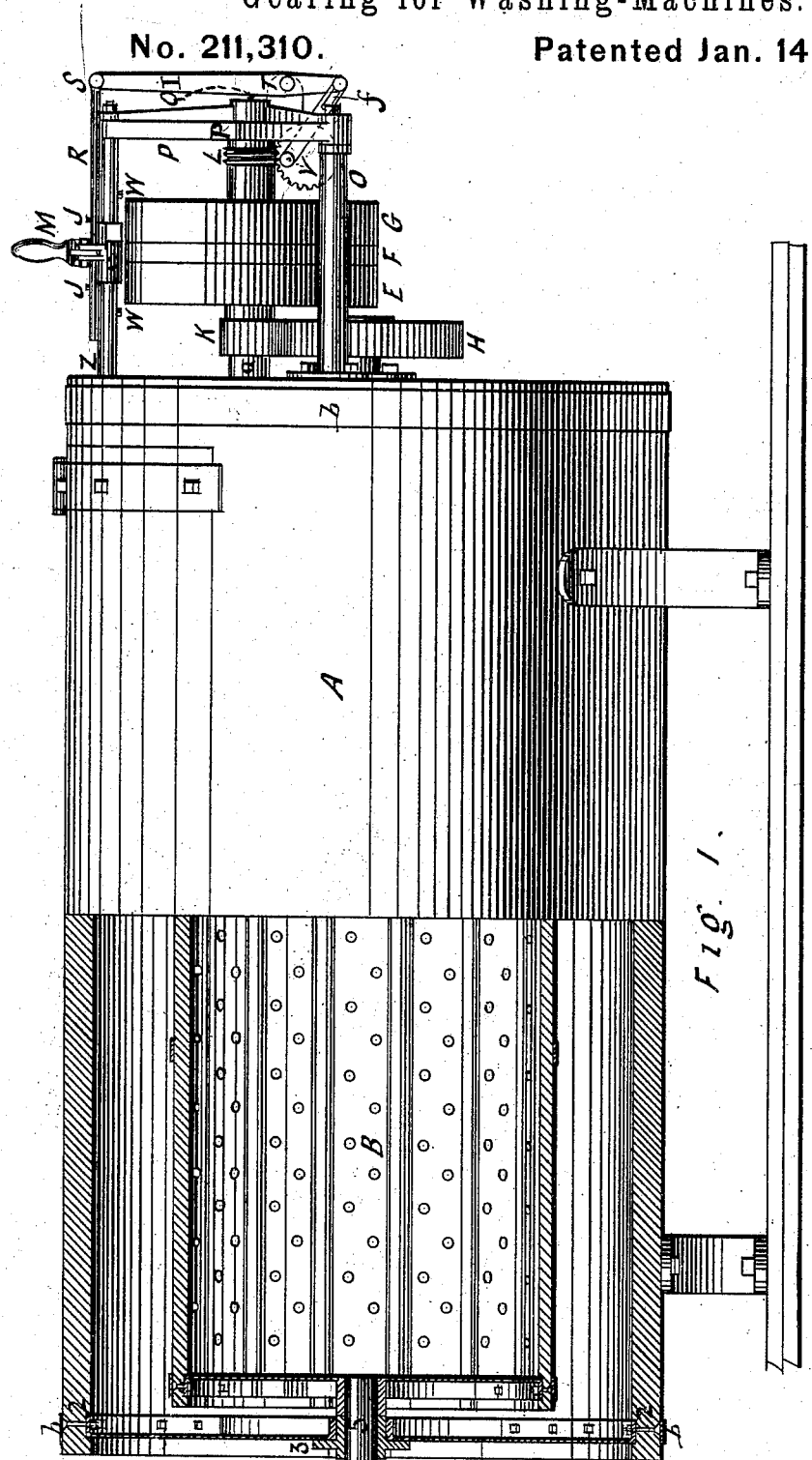
Figure 7:
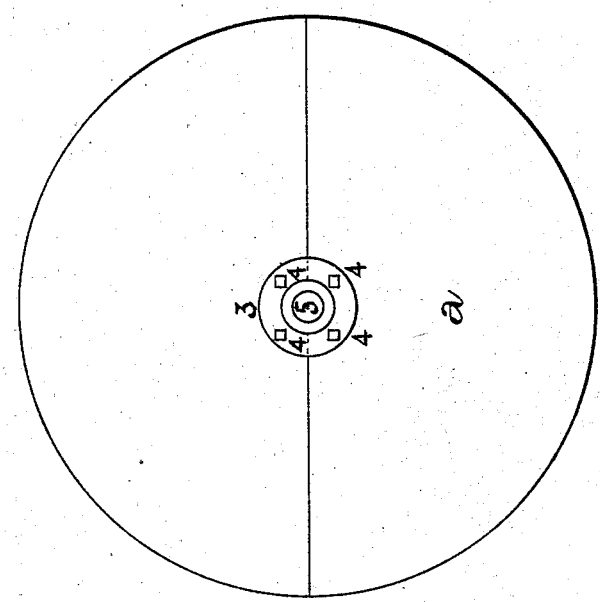
Figure 6:
Figure 5:
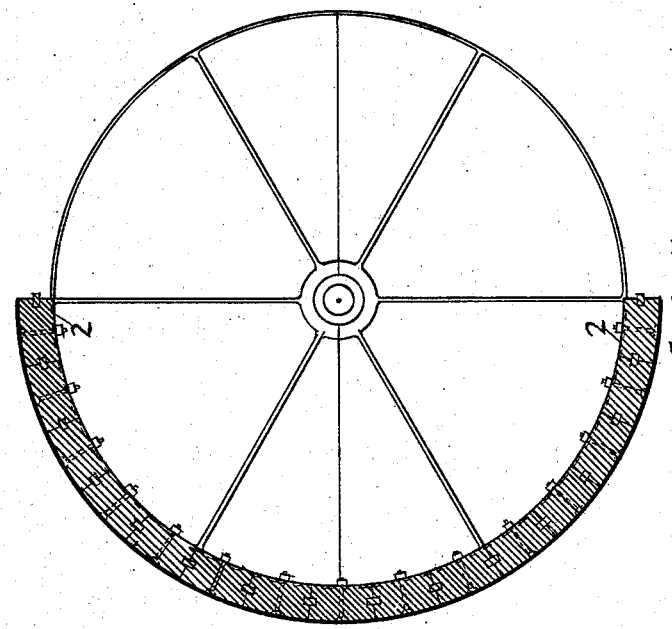

Figure 1 is a side elevation of a machine embodying my invention, partly in section. Fig. 2 is an end view of the same. Figs. 3, 4, 5, 6, 7 are detail views.

A represents the stationary suds-box or exterior shell, supported upon any suitable supports, and which is formed of wooden staves and metallic flanged heads $a$. These heads are each made in two parts, as shown, so that the upper half of the suds-box or exterior shell can be removed, for the purpose of inserting the revolving cylinder B and removing the same whenever necessary.

The rotary cylinder B, which is first made to revolve in one direction and then the other, is journaled inside of the exterior shell or suds-box. The bearings for the ends of this cylinder may be made as shown, or in any other suitable manner, as this forms no special part of my invention. Secured to the end of one of the journals, outside of the head of the shell, is a gear-wheel, H, which meshes with the pinion K, fast on the shaft Q. The outer end of this shaft Q is supported in the spider or bearing P, which is rigidly connected to the upper half of one of the flanged heads $a$ by the two lower supporting-columns, O, and the upper grooved guide-rod, Z, while the inner end of the shaft is supported by a suitable bearing cast on the flanged head $a$. Upon this shaft, between the spider P and the pinion K, are the loose pulley E, the narrow pulley F, which is secured to and operates the shaft Q, and the third pulley, G, which revolves loosely on the shaft Q, but operates the belt-shifting mechanism. These three pulleys are placed close together, the narrow fast pulley being placed in the center, and the three are run by two belts from the shaft overhead, one of which belts is crossed, so as to cause the two pulleys E and G to revolve in opposite directions, and the pulley F to alternately revolve in opposite directions as the two belts are moved back and forth, as more fully described hereinafter. Upon the hub of the pulley G is secured a screw or worm gear, L, which communicates motion to the wheel D on the end of a short shaft, which has its bearing in the spider P. Fastened to the wrist-pin V of this wheel D is a connecting-rod, C.

In order that each belt may remain upon the driving-pulley a suitable period of time to run the cylinder in a given direction the required number of turns, the outer end of the connecting-rod C is provided with a slot, $f$; or, if so preferred, the hooks $g$ may be substituted.

It will be seen that during the greater portion of the revolution of the wheel D the lever I remains stationary; but when the wrist-pin V approaches the end of its stroke, it will be seen that the end of the slot $f$ will come in contact with the pin U, thus moving the lower end of the lever sufficiently to shift the belts.

To the upper end of the lever I is pivoted the rod R, which is provided with the two stops J, placed at a suitable distance apart. The rod passes through an eye on the belt-shifter $c$, which is feathered on the grooved rod Z, and moves the shifter alternately back and forth between the two stops W. To this shifter are secured the two loops or guides Y, through which the two belts pass, and when the shifter is moved backward or forward on the rod Z the belts are moved back and forth on the pulleys, so that the pulley F is first driven by one belt and then the other. It will be seen that, as one of the belts is crossed, the cylinder will be revolved alternately in first one direction and then the other.

Pivoted to the shifter $c$ is a handle, M, which serves to start and stop the machine. When the handle is thrown forward its lower end catches in the notch N in the rod R and locks the shifter and rod together, so that when the lever I is moved backward or forward the shifter $c$ is made to move with it, and thus alternately shift the belts. When it is desired to stop the machine, the handle is thrown back, as shown in dotted lines, which disconnects the rod R from the shifter c, which shifter is then moved by one of the pins J sufficiently to remove the belt from the pulley F, when the two belts will be running on the loose pulleys, thus permitting the cylinder B to stop. The handle will then drop into a notch in the grooved rod Z, and thus lock the shifter in place.

Having thus described my invention, I claim—

1. In a gearing adapted for reversing the motion of the cylinder in a washing-machine, the slotted rod C, the crank D, and the pin U, the parts being arranged to operate substantially as shown.

2. In a gearing adapted for reversing the motion of the cylinder in a washing-machine, slotted rod C, as a means for communicating motion to the belt-shifting device, substantially as set forth.

3. In a gearing adapted for reversing the motion of the cylinder in a washing-machine, crank D, worm-gear, slotted rod C, and intermediate mechanism for transmitting motion to a belt-shifter, substantially as specified.

4. In a gearing adapted for reversing the motion of the cylinder in a washing-machine, the combination of the pulley G, turning loosely on the driving-shaft Q, and provided with a worm, or its equivalent, for driving the wheel D, a slotted connecting-rod, C, a lever, and a belt-shifting mechanism, substantially as set forth.

5. In a gearing adapted for reversing the motion of the cylinder in a washing-machine, the rod Z, having the belt-shifter feathered upon it, the said rod forming one of the supports for the spider, substantially as described.

6. In a gearing adapted for reversing the motion of the cylinder in a washing-machine, the rod Z, provided with a groove and stops W, and a belt-shifter, the parts being arranged to operate as shown.

7. In a gearing adapted for reversing the motion of the cylinder in a washing-machine, the rod Z, having a belt-shifter moving thereon, a rod, R, and a locking-handle, substantially as described.

8. In a gearing adapted for reversing the motion of the cylinder in a washing-machine, the rod R, having the notch N, and stops J, in combination with a belt-shifter, substantially as set forth.

9. In a gearing adapted for reversing the motion of the cylinder in a washing-machine, the columns O, spider P, and rod Z, the said parts forming the support for the operating mechanism, substantially as specified.

LEWIS H. WATSON.

Witnesses:
J. N. HITCHCOCK,
J. C. HITCHCOCK.